Figure 7:
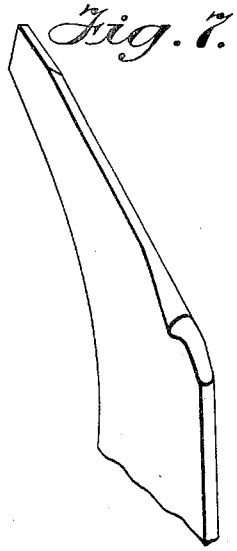

No. 689,917. Patented Dec. 31, 1901.
H. G. SAWYER & E. A. HENDRICKS.
DIE FOR FORMING WELDING EDGES FOR PLOW POINTS.
(Application filed Aug. 19, 1901.)
(No Model.) 3 Sheets—Sheet 1.
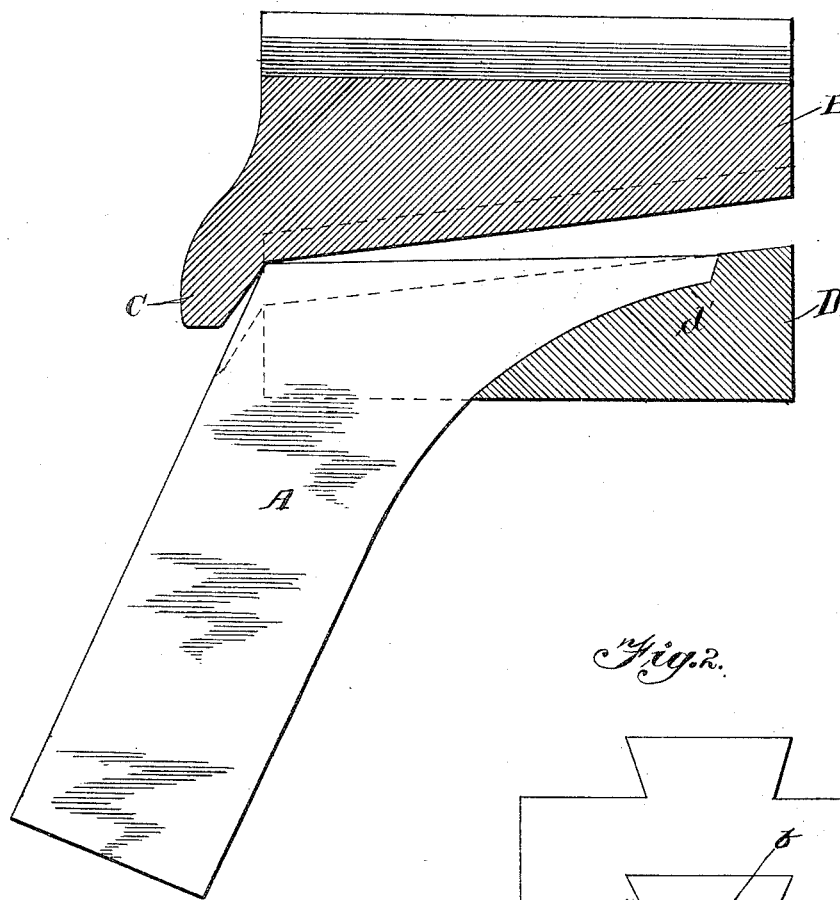
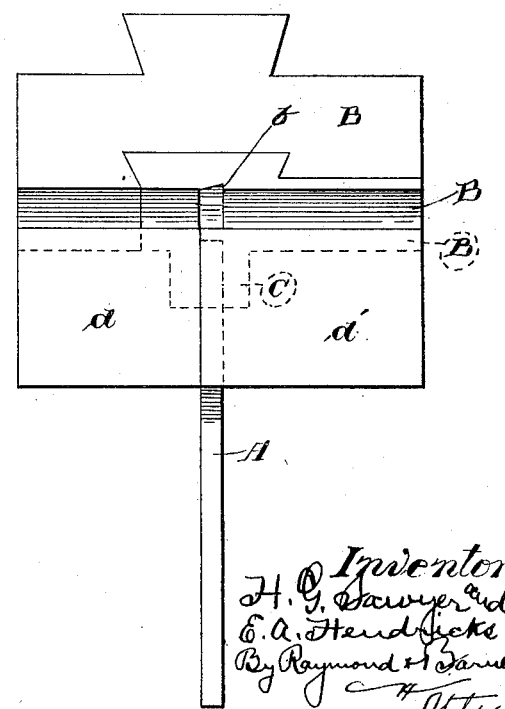

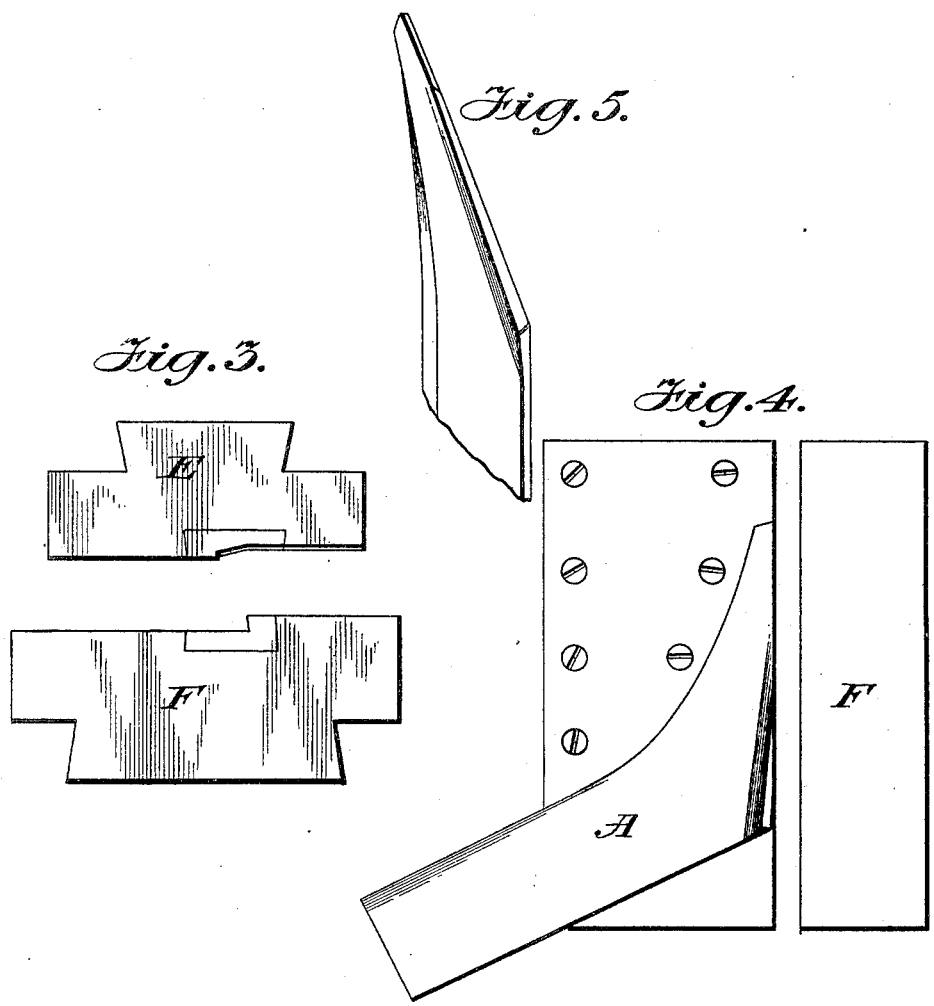

No. 689,917. Patented Dec. 31, 1901.
H. G. SAWYER & E. A. HENDRICKS.
DIE FOR FORMING WELDING EDGES FOR PLOW POINTS.
(Application filed Aug. 19, 1901.)

(No Model.) 3 Sheets—Sheet 3.

Witnesses:
F. H. Drury
C. W. Smith

Inventors:
Henry G. Sawyer &
Edward A. Hendricks
by Raymond & Barnett
attys

THE NORRIS PETERS CO., PHOTO-LITHO., WASHINGTON, D. C.

UNITED STATES PATENT OFFICE.

HENRY G. SAWYER AND EDWARD A. HENDRICKS, OF CARPENTERSVILLE, ILLINOIS, ASSIGNORS TO STAR MANUFACTURING COMPANY, OF CARPENTERSVILLE, ILLINOIS, A CORPORATION OF ILLINOIS.

DIE FOR FORMING WELDING EDGES FOR PLOW-POINTS.

SPECIFICATION forming part of Letters Patent No. 689,917, dated December 31, 1901.

Application filed August 19, 1901. Serial No. 72,619. (No model.)

*To all whom it may concern:*

Be it known that we, HENRY G. SAWYER and EDWARD A. HENDRICKS, citizens of the United States, residing at Carpentersville, in the county of Kane and State of Illinois, have invented certain new and useful Improvements in Dies for Forming Welding Edges for Plow-Points, of which the following is a specification.

The object of our invention is to provide means for forming plow-points in which the welding edges shall be provided with a sufficient quantity of metal to insure a solid welded joint between the plow-point and the landside of the plow, especially at the heel of the plow-point.

A further object of our invention is to provide a plow-point at its welded edge with sufficient metal to allow a certain latitude of manipulation in welding the plow-point to the landside, so that if a successful weld is not made at the first attempt repeated weldings may be had without harmfully reducing the metal at the welded edge.

Our invention relates to plow-points in which the metal for the welding edge is obtained by upsetting said edge, such as is shown in the patent to Henry G. Sawyer, No. 530,204. It has been found, however, that in forming plowshares by upsetting the welding edge of the point in the manner described in said patent the upset portion of the metal does not fully extend to the heel of the point, so that when the landside is welded to the plow-point the welded joint between the landside and the plow-point is weak at the heel of the plow-point, and indeed it often happens that for want of sufficient metal at this point there is a failure to weld the landside to the plow-point at the heel of the plow-point. As a matter of fact the curve of the plowshare as usually constructed is such that a great if not the greatest strain is brought to bear upon the plowshare just at the heel of the plow-point, and a weakness at this point often results in the landside being torn from the plowshare.

Our device for forming the welding edges of plow-points so that the same shall be provided with a full thickness of metal at the heel of the plow-point, as well as along the other portions of the welding edge, is illustrated in the accompanying drawings, in which—

Figure 6:
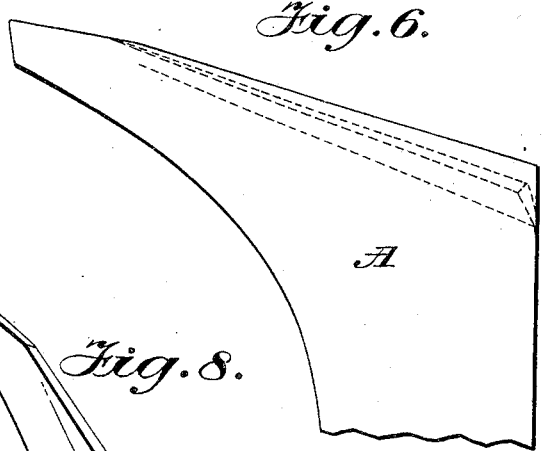
Figure 8:
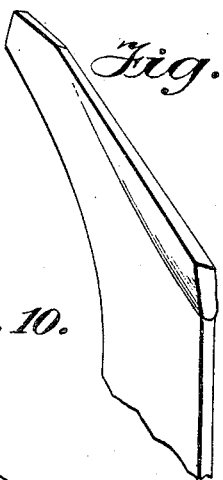
Figure 10:
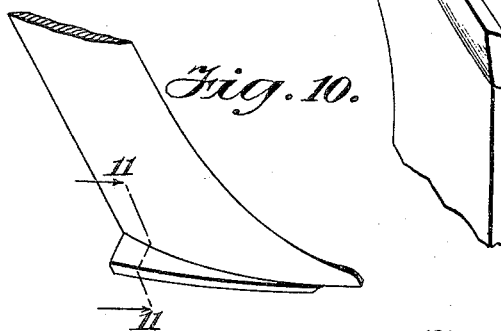
Figure 9:
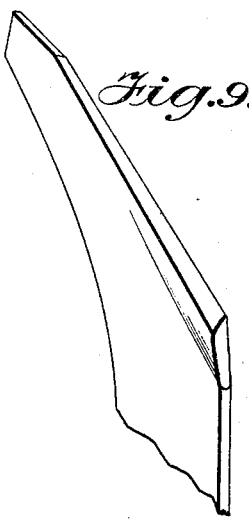
Figure 11:
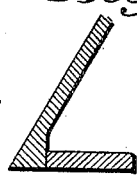

Figure 1 is a longitudinal sectional view through the upsetting-dies with the blank in position therein. Fig. 2 is an end view of the same. Fig. 3 is an end view of the finishing-dies. Fig. 4 is a plan view of the finishing-dies with the plow-points in position therein. Fig. 5 is a perspective view of a completed plow-point. Fig. 6 is a plow-point blank. Figs. 7, 8, and 9 show the plow-point in successive stages of formation. Fig. 10 is a perspective view of the plow-point with the landside welded thereto, and Fig. 11 is a vertical sectional view on the line 11 11 of Fig. 10 looking in the direction indicated by the arrows.

Like letters of reference indicate the same parts in the several figures of the drawings.

Referring by letter to the accompanying drawings, A indicates a blank, dotted lines indicating the portion upset and formed with our device.

B is an upper upsetting-die, such as is commonly used in drop-forging, provided with a groove $b$ in the under face thereof and provided at one end with the upsetting-shoulder C.

D is the lower die, formed in sections $d\ d'$, between which is clamped the blank A.

We prefer to form our dies B D with their opposite faces extending at an angle to the upper edge of the blank A when the same is clamped in position in the lower die D, so that as the die B falls upon the blank A it will first engage the upper edge thereof adjacent to its heel $a$, so that the upsetting action of the die is graduated from the heel of the blank, where the greatest upsetting action occurs, to the point of the blank, which may be substantially or entirely free from any upsetting action. If the die B were not provided with the upsetting-shoulder C, then as the die B is dropped upon the blank A the upper edge of the blank would be upset along a line substantially at right angles to the upsetting-face of the die B. Such an upset obviously would not extend to the heel of the blank and would leave the heel subject to all of the objections previously noted. By providing the die B with the upsetting-shoulder C, which engages the heel of the blank along the back edge thereof, we succeed in simultaneously upsetting the bottom edge of the blank and the back edge of the heel, as is more clearly shown in Figs. 7, 8, and 9, the groove *b* serving to upset and form the bottom edge of the blank, while at the same time the shoulder C upsets the rear or heel edge of the blank and forces the metal forward in the direction of the metal upset by the under face of the die B, thereby upsetting the metal into that portion of the heel of the blank which has heretofore been unaffected by the action of the upsetting-dies. The first action of the dies is to somewhat distort as well as to upset the blank, as is shown in Fig. 7. This is corrected by next laying the blank flat between the opposing flat faces of the dies B D and straightening the blank and again subjecting it to the upsetting action of the dies until the desired upset is obtained. While the blank as left at this stage may be used and the edge of the landside may be welded thereto by proper manipulation, we prefer to finish the blank by giving it a properly-tapered welding edge, which shall not only taper in cross-section, as shown in Fig. 11, but shall also taper from the heel to the point of the plow-point and shall be sufficiently true for the ready welding of the landside thereto. It is also desirable that the under or ground edge of the plow-point shall be finished at an angle to the vertical side thereof, so that when the under edge of the plow-point is laid on a flat surface the plow-point will lean very perceptibly from the perpendicular and away from the landside, which may be welded thereto. To obtain this finish, we provide the finishing-dies E F, one of which forms the under edge of the plow-point with the desired incline and the other of which finishes the upset with the required taper and a sufficiently true welding-surface. The upsetting of the plow-point having been completed in the dies B D, the plow-point is laid on its side in the die F, as shown in Fig. 4, and is finished by having the die E dropped thereon while the plow-point is in a sufficiently-heated condition.

By means of our apparatus we succeed in forming a plow-point which, as shown in Fig. 5, is upset, so as to form a properly-tapered welding edge clear back to the heel of the plow-point, to which the landside can be securely welded at all points, and which instead of being weak at the joint between the heel and the landside will afford the strongest welded joint at that point. It is common practice to furnish these plow-points in large quantities to jobbers, who supply them to local blacksmiths throughout the country, who in turn weld them to plowshares by hand as orders therefor may be received. As this hand-welding is not always a certain process, it is important to these local blacksmiths that the plow-points shall be furnished to them in such form that the welding edge may be repeatedly hammered and welded without unduly weakening the plowshare at this point. By means of our device we are enabled to produce a plow-point which meets this requirement, while our finishing and shaping of the upsetting edge serves not only to furnish a better and truer edge for welding the landside to, but by forming a clear line which indicates where the upset portion of the metal begins we furnish the local blocksmith and others with a guide which correctly shows them where the upsetting or thickening of the metal starts and where it may be safely forged without unduly weakening the plowshare.

Having thus described our invention, what we claim, and desire to secure by Letters Patent, is—

1. A die for upsetting the welding edge of a plow-point comprising a face for upsetting the edge of the plow-point and a shoulder disposed at an angle to said face for upsetting the back edge of the plow-point at a point adjacent to its junction with the welding edge, substantially as described.

2. In a mechanism for forming the welding edge of a plow-point, means for upsetting the welding edge of the plow-point, and for simultaneously upsetting a portion of the back edge of the plow-point at and adjacent to its junction with the welding edge, substantially as described.

3. A set of dies for shaping the welding edges of plow-points, comprising a pair of dies for upsetting and partially forming the welding edge of a plow-point and for simultaneously upsetting a portion of the back edge of the plow-point adjacent to its junction with the welding edge, and dies for finishing said upset welding edge with a longitudinal and vertical taper, substantially as described.

HENRY G. SAWYER.
EDWARD A. HENDRICKS.

Witnesses:
R. W. GRIFFITH,
J. C. BOHN.